Aug. 19, 1930.  V. STEVES  1,773,648
PROCESS FOR MUSHROOM CULTURE
Filed Aug. 19, 1929
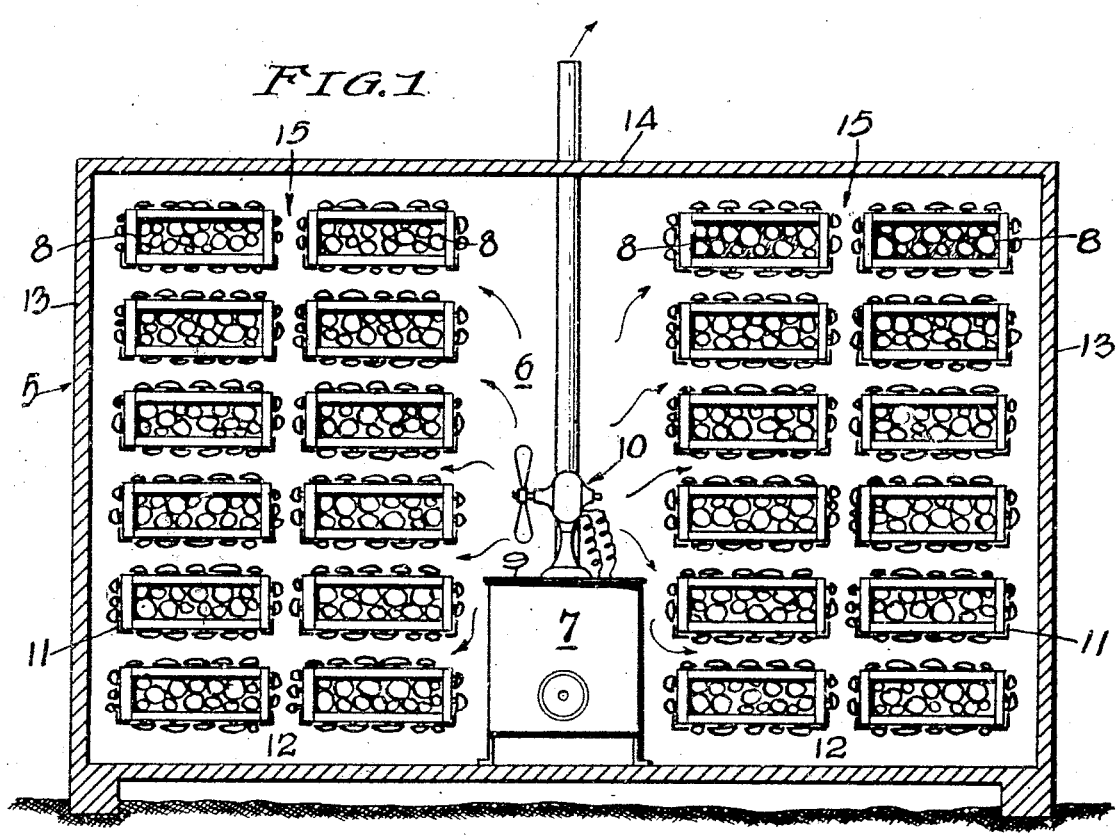
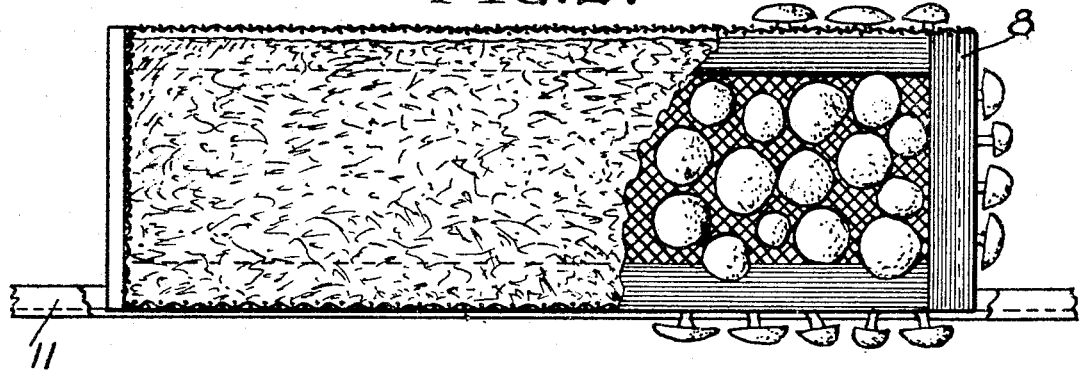
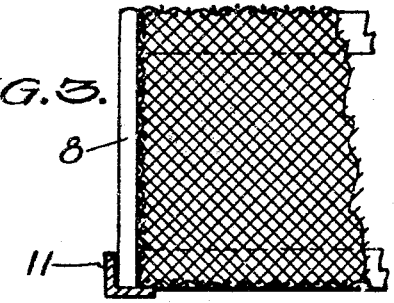
INVENTOR.
VERNON STEVES.
BY
ATTORNEY Patented Aug. 19, 1930

1,773,648

UNITED STATES PATENT OFFICE

VERNON STEVES, OF OLEUM, CALIFORNIA

PROCESS FOR MUSHROOM CULTURE

Application filed August 19, 1929. Serial No. 386,794.

This invention relates to the process of mushroom culture in which the specially prepared mold or soil for their propagation is confined in screen-trays adapted to be cased in spaced relation in tier formation in darkened propagating rooms under properly controlled conditions as to temperatures and humidity, and has for its objects to render the process more expeditious, and more productive at lessened cost, and to improve upon my co-pending application, Serial No. 387,127, filed August 20, 1929.

In the culture of mushrooms, as ordinarily practiced, no particular attention has been given to the proper preparation of the soil, maintenance of suitable moisture conditions, temperature regulation, nor largely increased crops within restricted areas.

Instead of depending solely upon a single surface area for the growth of mushrooms, I employ trays of screen structure, in the utilization of which, all surfaces, tops, bottoms, sides and ends, contribute to the cultural area, the growths extending therethrough and beyond in all directions, thus providing an increased yielding area and a product freed from soil contaminations and in positions rendering the crop easily and readily harvested.

Mushrooms do best when grown in total darkness, admitting light only when working in the propagating room. But slight ventilation should be allowed in the room, as this will assist in preventing the undue escape of moisture from the air and provide those conditions so necessary to successful mushroom growing. However, care is to be taken to not too greatly reduce ventilation, as to do so would result in such a degree of precipitation as to cause water to drip from objects throughout the room. Nevertheless, it is important that the air be kept fresh, yet using as little ventilation as will permit the moisture in the soil to remain there for long periods without supplying additional water.

The accompanying drawings illustrate an apparatus suitable for the purpose of carrying out my process, in which:

Figure 1 is a vertical sectional view showing a propagating room having mounted therein in tiers a plurality of wire-mesh propagating trays, a centrally located heating element, and a suitable revolving blower fan, a vent also being shown leading from the heating element to the atmosphere;

Figure 2 is a side elevation illustrating the preferred form of wire-mesh propagating tray for use in connection with my process; and Figure 3 is a sectional detail of the same.

It is important in the growth of mushrooms that a temperature of not less than 53 degrees, nor more than 63 degrees, Fahrenheit, be constantly maintained in the propagating room. This is not a difficult temperature to be maintained, but, as the outer part of the room 5 will normally be at a much lower degree than that of the space 6 next to the heater 7, thereof, the actual mean temperature should be practically constant, or with but slight variations. It is to be understood that in the growing of mushrooms, in accordance with my process, the right temperature must be maintained throughout the year, and that, ordinarily, the temperature for individual wire-mesh trays 8, should not vary more than three or four degrees during the entire time required for the development of the crop.

If the weather or climate is such that the normal temperature of the propagating room 5 is raised above sixty degrees, Fahrenheit, it will be necessary to install a suitable refrigerating means (not shown). A certain well-known type of refrigerating machine has proven to be particularly well adapted for this purpose, as it can be readily installed, either in the heating chamber of the heater 7, or placed on the top 9 thereof.

These refrigerating machines are automatic in action and will properly control the temperature without attention. An electric fan 10 is operated in connection with a refrigerating means, and in the same manner as if it were the heater that was being used. If the refrigerating machine is operated from top of heater, the fan 10 should be operated directly above it, that the cool air may be circulated freely throughout the entire room.

Mushrooms, in accordance with my process, are grown almost entirely in a pure fertilizer, there being but a very slight covering of loam used on the top of the prepared fertilizer. The only fertilizer that can be used successfully is horse manure. To prepare it so that the mushroom spawn will grow, it is very important that it be heated in the following manner: First, twice the quantity of manure that would appear to be necessary to fill all the mushroom trays intended for use should be procured. The freshest horse manure that is to be had, should be selected, which should also include the parts of the bedding material containing the liquids. This manure is then stacked in some old shed, not more than five feet in depth, and should be packed solid. If it is not already quite wet, it should be made so by sprinkling it until it is, but by no means drenching it.

Second: If the weather is warm, the manure will begin heating in a day or so, and should be allowed to continue heating for a period of from twenty-five to thirty days. Considerable attention should be given the manure at this stage, and, about once a week, it should be forked over well, and, if found to be too dry, some water should be applied, the object being to get as high a temperature as is possible without burning the compost. Under no circumstances, should it be allowed to heat itself dry. To do so would not only render it useless for mushroom growing, but might give rise to spontaneous combustion.

Third: After the first three weeks, the bacteria of rapid decay will become less and less, the temperature begin to lower, and the mass becomes almost odorless. At this time, it should be gotten into the properly moistened condition for the trays, which is a step of importance, as no more water should be applied to the soil for several weeks. The proper amount of moisture for the fertilizer, at this time, is the same as that maintained throughout the crop, this being just sufficient to render it set enough to be quite moist but not enough so as to cause a drop of water to collect on the bottom of the trays after being placed in them.

A thermometer should be inserted into the stack of fertilizer, at intervals, to ascertain temperature changes in the mass, and, when the temperature in the center of the mass has been lowered to 70 or 73 degrees Fahrenheit, it is in readiness for putting in the trays and to receive the spawn.

Success in mushroom culture is not possible with an other fertilizer than horse manure, and this should not be mixed with other fertilizers. Good crops of mushrooms cannot be secured from manures that were well rotted before beginning the heating process.

After the fermenting fertilizer has passed a period of fifteen days, and is still heating at high temperature, one pound of the compost is taken out for each tray intended to be used. This fertilizer is then put in a shallow box, and the same amount of good moist black heavy loam is mixed with it. This mass is then well mixed and under no circumstance should it be more than six inches deep. This box is then placed in the culture room, or some place where its temperature will not fall below 53, nor rise above 63 degrees Fahrenheit. If it is not quite moist enough to begin the spawn, it will have to be sprinkled lightly. After twenty-four hours, the temperature of this soil should be noted, and if it has lowered to 75 degrees, or to the temperature of the propagating room 5, it is in readiness for planting the starter.

For spawning purposes a brick of the light colored variety of mushroom spawn is to be used for every five trays. These bricks, just as they come, without breaking them down, should be put into the center of the soil in a box. The next day they will have been found to have softened up, and should then be broken into small pieces about the size of a thumb-end. No water should be added to the soil. These pieces of mushroom spawn are then mixed up well with the entire soil, and packed extremely solid, and the bed then covered and kept covered with a double thickness of grain sacks. Before using the sacks they must be boiled for one hour, then allowed to become cool, and are then ready for covering the soil. The sacks are not to be fully dried, merely surplus water squeezed out of them.

The bed must be kept covered at all times, and on the seventh day, the soil must be well mixed up again and thereafter packed solidly and let set until the stack of prepared fertilizer is ready for the trays and spawning. Ordinarily the soil will stay moist during the entire time it is in the box, without additional water; however, if it does not, and begins to get dry, it must be sprinkled very lightly, or just enough to get it back into the proper moistened condition. If the brick spawn is good, white mold-like threads will appear penetrating the soil. This can usually be seen about the tenth day and, when it is time to begin spawning the trays, it will be quite like a solid mass of white mold mixed in with the soil, and is now the best mushroom spawn that it is possible to produce. The best time to use this, now fast growing spawn, for planting in the trays is between the 14th and 21st days, the time being counted from the day when the first brick spawn was planted.

The day before planting the spawn in the trays, one large bucketful of heavy black loam should be provided for each tray, and this loam placed as near as possible to the stack of prepared fertilizer, that it may be conveniently at hand when ready to case the trays. As previously stated, any soil will not meet requirements in this work, the most serious trouble to be apprehended therefrom being that of mushroom growth on the inside of the screen. Sand and clay are equally unsatisfactory for the purpose. Excessive moisture in the loam used for tray casing is to be avoided. This, while quite moist, should never go beyond the point of being almost sticky, or a point at which water would drip from it.

After completing the processing of the fertilizer, and its temperature, of its own accord, having lowered to that of from 70 to 73 degrees, it should be put in the mushroom trays and spawned at once. To properly fill the trays, they should be taken out to the stack of prepared fertilizer and there filled one at a time, first packing about one inch of the fertilizer in the bottom of each tray, then sprinkling in a little of the prepared mushroom spawn all around the entire tray bottom, and completing the filling with fertilizer.

As the filling up of the sides progresses, it is required that some spawn be placed about one inch from the wire, and also that the spawn be completely scattered throughout the fertilizer lying within one inch of the wire, doing this to the ends, as well as to the sides and bottom. Spawn should not be put in the center of trays, nor in any other place, but be confined to the one inch limit.

The fertilizer should be packed in the trays just as solidly as it is possible to be done without distortion of the shape of the trays. A little spawn should also be put on the top part of the tray, the same as for the bottom. The prepared spawn should be weighed, using no more than two pounds for the spawning of each tray, the spawn being previously broken up into quite fine pieces, if not already in that condition. No water is to be used on the prepared spawn during time of spawning the trays.

Tray casing is to immediately follow the filling of the last tray, and consists of first forcing as much of the black loam through the wire-mesh into the fertilizer as can be conveniently done, after which a board-covering bearing a piece of timber of a suitable thickness is placed thereover and forced down thereupon by means of cinching-straps, provided with buckles and eye-lets, that have been placed thereabout.

A tray thus cased, is placed on a table bottom-side up, and a small portion of the black loam forced through the mesh by the aid of a mason's trowel. If the loam be just right, it will smooth down as though it were plaster that was being worked, but this coating should be of no greater thickness than can be forced inside the tray and fill completely all the meshes of the wire-screen. If this casing is not properly applied, the mushrooms will grow on the inside of the wire, with resulting contamination and inconvenience in plucking them. The object is to form a coating of tight fitting soil, through which, as the spawn grows, it may force all the developing threads to the outside of the wire, since it is there that the pin-head mushrooms first begin, and as they grow, are kept free from all dirt and are retained in positions from which they may be readily plucked.

The threads penetrate the soil and fertilizer outwardly, supplying nutriment to the growing mushrooms. After properly casing the sides, ends and bottom, the board and straps should be removed from the top and a layer of one and a half inches of loam should be pressed over, this being made to come up even with the top rim of the tray and to about one inch higher in the center, this giving soil to fill up the tray, as it will shrink some after the crop begins bearing. The same board cover and straps should be used on all the trays as they are being cased.

The trays are then hauled to the room and placed in their racks 11 the day they are spawned. The trays should be placed in the racks 11 in a properly arranged manner, as they are not to be moved again until after the crop is grown and harvested, after which they are to be taken out to be again filled with new soil. Trays that are moved after the spawn begins coming to the screen, produce most all mushrooms on the inside of the wire-mesh, and will soon stop bearing altogether. However, it is sometimes necessary to pull out the trays from the racks, in order to pick the mushrooms. If care is used to not crack or chip off any of the casing loam, no actual harm is likely to happen to the growing mushrooms.

It is usually not necessary to apply any water to the soil for two or three weeks after spawning, as too much water will positively destroy the profits of the mushroom crop; but it will prove quite as harmful, if the soil be allowed to become too dry. Proper conditions require that the soil be kept quite moist and, when it appears to be getting a little dry, the best way to restore humidity is to apply an extremely small amount of water by sprinkling or spraying a small amount just over the top soil, and no attempt should be made to wet the soil to a greater depth than an inch or two, and repeating in a day or two.

Humidified after this manner, the soil will be found to be more satisfactorily moistened throughout than it would be, were the full amount of water to be supplied at one time.

The tray department 12 of the propagating room 5 is filled with trays by placing them one above the other and setting them so that they will slide properly between the racks 11. As many of the racks may be placed in the room as there is possible space for, beginning a row about three feet from the walls 13, building it all the way down the room and reaching to within one foot of the ceiling 14 thereof, and building as many of these tiers as the height of the room will permit. A passageway 15 of three feet between the different sets of rows should be allowed. No trays should be placed closer than a distance of five feet from the heater 7 and chamber door of heated room.

All those trays occupying places in the warmest part of the room, or those that have been constantly subjected to temperatures of from 59 to 63 degrees Fahrenheit, should begin bearing mushrooms by the sixth week after spawning. Trays that have been subjected to greatly varying temperatures during the period of growth will not begin bearing for some time later. The trays in the cooler parts of the propagating room and under constantly maintained temperatures of from 53 to 59 degrees, usually begin bearing by the seventh or eighth week. If the temperatures of the room have varied some eight or ten degrees daily during this growing period, the bearing will not begin until after the eighth week, if it begins at all. Temperatures of wide variation are considered fatal to the growing spawn. A temperature below 53 degrees is much less harmful to the spawn than is one of above 63 degrees.

The life term of a single crop varies greatly, ranging from six weeks to as many months. Conditions under which the mushrooms are being grown control the life of the spawn. Trays that produce large and solid buttons will continue bearing many months, if conditions remain constant.

Ten pounds of button mushrooms per month per trays is a good average yield; however, in many cases, more than double that amount may be obtained under proper conditions.

Exceedingly big yields are to be obtained only when the fresh manure used as a fertilizer contains an extra amount of the natural liquids.

Sometimes the mushrooms will all come single, each having a single feeding thread which penetrates the soil on the inside of the tray. These are picked by grasping both the cap and the stem and giving a slight twist, the thread then breaking off just on the inside of a wire, leaving the picked mushrooms free from any and all contamination. The mushrooms growing on the top soil in the trays are picked in the same way, except that the stem is cut off just above the dirt line after it is picked, this being done as each one is gathered from the tray, for the sole purpose of keeping the dirt clear from the other mushrooms and the prevention thereby of a lowering of the grade.

Sometimes the entire crop will be produced in clusters of from a dozen to more than a hundred in one unit, this seeming to always occur in cases where extra large crops are obtained. In picking these mushrooms from the clusters, extra care must be taken not to break loose any of the small buttons from the feeding threads. It is quite difficult to do this, but it should be remembered that every small button broken off from the connecting threads is most certainly reducing the yield of the crop. A sharp pen knife is often used to good advantage in picking the mushrooms.

In all cases, the cords should be cut off even with the wire. Never under any condition should a mushroom be left growing on the tray after the veil under the cap begins to break and open up. If this happens, it usually has such a weight that it breaks hundreds of the little button mushrooms off the wire just immediately under it. The proper size to pick depends wholly on the market demand. Ordinarily, the larger buttons are most profitable for the grower to produce. Mushrooms should always be sorted and packed in pound boxes.

They should be marketed a few hours after being picked, if the highest prices are to be expected. They should never be washed, as this causes their color to change. All soil that may have adhered to the stems should be brushed off. All should be cut to a uniform length of stems, one inch, to give to them a neat appearance. Picking should be done daily, if the temperature of the room is maintained at 60 degrees or more; if of much lower temperature, every other day will be found to meet satisfactorily the requirements.

Continued production is best secured in the following manner: As soon as the first crop of mushrooms is beginning to bear, more fertilizer should be prepared, this requiring, at this time, only about one fourth the amount first used. Later, as a few of the trays begin lowering in production, they can be emptied, refilled and respawned, and replaced into their original cell in the propagating room. It will be found that the room, if thus properly cared for, will contain about an equal number of new producing trays by the time the last ones of the first crop have begun to lower in production.

Fogging-off is perhaps the most common trouble experienced among commercial mushroom growers. This sometimes occurs, though not often, during the pin-head stage of the mushrooms. They will turn dark, cease to grow and soon decay. This trouble may arise from any one of the following causes: the use of too much water, either at the time of spawning or later; unfavorable temperatures; running the electric fan at too high speed, thereby causing constant drafts; moving the trays after spawning; the use of poor brick spawn as a starter; and spawning the trays at temperatures above 78 degrees Fahrenheit.

I claim:

1. The process for mushroom culture, which consists of producing a compost of manure and black loam formed into a compact mass, seeding the same on all sides with mushroom spawn, and finally coating the mass surface on all sides with a coating of black loam of plastic consistency.

2. The process for mushroom culture, which consists of producing a compost of decomposed manure and black loam formed into a compact plastic mass, seeding the same on all sides with prepared mushroom spawn, and finally coating the mass on all sides with a coating of black loam of plastic consistency.

3. The process for mushroom culture, which consists of producing a compost of decomposed horse manure, stall-litter and black loam, forming the same into a compact plastic mass, seeding the same on all sides with specially prepared mushroom spawn, coating said mass on all sides with a casing of rich black loam, and finally subjecting the prepared and spawned mass to a temperature ranging from 53 to 63 degrees Fahrenheit.

4. The process for mushroom culture, consisting in first forming from fresh horse manure and accompanying liquids a decomposed mass, mixing said mass with a measured portion of rich black loam to form a plastic body, seeding all sides of said body with prepared mushroom spawn, coating all sides of the thus prepared and seeded body with a layer of prepared black loam of plastic consistency, and then storing the culture in a darkened properly temperatured and ventilated propagating room.

5. The process for mushroom culture, consisting in first forming from fresh horse manure and accompanying liquids a decomposed mass, mixing said mass with a measured portion of rich black loam to form a plastic body, seeding all sides of said body with prepared mushroom spawn, coating all sides of the body with plastic black loam, and then storing the culture in a darkened room temperatured between the minimum temperature of 53 degrees and the maximum temperature of 63 degrees for a period of from six to eight weeks.

In testimony whereof I hereby affix my signature.

VERNON STEVES.